US008378908B2

(12) United States Patent
Wisler et al.

(10) Patent No.: US 8,378,908 B2
(45) Date of Patent: Feb. 19, 2013

(54) ARRAY ANTENNA FOR MEASUREMENT-WHILE-DRILLING

(75) Inventors: Macmillan M. Wisler, Kingwood, TX (US); Larry W. Thompson, Willis, TX (US); Jian-Qun Wu, Kingwood, TX (US); Michael S. Spencer, Conroe, TX (US)

(73) Assignee: Precision Energy Services, Inc., Fort Worth, TX (US)

( * ) Notice: Subject to any disclaimer, the term of this patent is extended or adjusted under 35 U.S.C. 154(b) by 1008 days.

(21) Appl. No.: 11/685,040

(22) Filed: Mar. 12, 2007

(65) Prior Publication Data
US 2008/0224707 A1 Sep. 18, 2008

(51) Int. Cl.
*H01Q 1/04* (2006.01)

(52) U.S. Cl. ......... 343/719; 324/338; 343/787; 343/788

(58) Field of Classification Search .................. 342/388; 343/787, 788, 719; 324/338
See application file for complete search history.

(56) References Cited

U.S. PATENT DOCUMENTS

| | | | | |
|---|---|---|---|---|
| 3,808,520 | A | | 4/1974 | Runge |
| 5,212,495 | A | * | 5/1993 | Winkel et al. ................. 343/872 |
| 5,406,206 | A | * | 4/1995 | Safinya et al. ................. 324/338 |
| 5,434,507 | A | * | 7/1995 | Beren et al. ................... 324/338 |
| 5,530,358 | A | | 6/1996 | Wisler et al. |
| 6,181,138 | B1 | | 1/2001 | Hagiwara et al. |
| 6,297,639 | B1 | | 10/2001 | Clark et al. |
| 6,476,609 | B1 | | 11/2002 | Bittar |
| 6,788,065 | B1 | * | 9/2004 | Homan et al. ................. 324/338 |
| 7,038,457 | B2 | * | 5/2006 | Chen et al. ..................... 324/339 |
| 7,098,858 | B2 | * | 8/2006 | Bittar et al. .................... 343/719 |
| 7,239,145 | B2 | * | 7/2007 | Homan et al. ................. 324/356 |
| 7,839,149 | B2 | | 11/2010 | Wang et al. |
| 7,839,346 | B2 | * | 11/2010 | Bittar et al. .................... 343/719 |
| 2005/0189945 | A1 | * | 9/2005 | Reiderman .................... 324/333 |
| 2005/0212520 | A1 | | 9/2005 | Homan et al. |

FOREIGN PATENT DOCUMENTS

| | | |
|---|---|---|
| EP | 560651 | 9/1993 |
| EP | 1901094 | 3/2008 |
| EP | 1901094 A1 * | 3/2008 |

(Continued)

OTHER PUBLICATIONS

Search report received for corresponding application No. GB0802527.2 dated May 8, 2008.
Office Action from the Canadian Intellectual Property Office dated Feb. 21, 2011 received in corresponding CA patent application No. 2,619,623.

*Primary Examiner* — Hoang V Nguyen
*Assistant Examiner* — Kyana R McCain
(74) *Attorney, Agent, or Firm* — Wong, Cabello, Lutsch, Rutherford & Brucculeri, L.L.P.

(57) ABSTRACT

An electromagnetic antenna for Measurement-While-Drilling (MWD) applications is disclosed. The antenna can include several array elements that can act alone or together in various measurement modes. The antenna elements can be disposed in tool body recesses to be protected from damage. The antenna elements can include a ferrite plate crossed or looped by independent current carrying conductors in two or more directions forming a bi-directional or crossed magnetic dipole. Although disclosed as a MWD system conveyed by a drill string, basic concepts of the system are applicable to other types of borehole conveyance.

70 Claims, 12 Drawing Sheets

FOREIGN PATENT DOCUMENTS

| | | |
|---|---|---|
| GB | 2303215 | 2/1997 |
| GB | 2387033 | 10/2003 |
| GB | 2391392 | 2/2004 |
| GB | 2412743 | 10/2005 |
| GB | 2412744 | 10/2005 |
| GB | 2418440 | 3/2006 |

* cited by examiner

FRONT VIEW

BACK VIEW

FRONT VIEW

BACK VIEW

FRONT VIEW

BACK VIEW

LONGITUDINAL CURRENT

TRIAXIAL COMMON ORIGIN

CIRCULARLY POLARIZED

QUADRAPOLE

SINGLE AXIAL DIPOLE

ARRAY ANTENNA FOR MEASUREMENT-WHILE-DRILLING

This invention is directed toward measurements made within a borehole, and more particularly directed toward an electromagnetic measurement-while-drilling (MWD) or a logging-while-drilling (LWD) system comprising at least one array antenna.

BACKGROUND OF THE INVENTION

A measurement of electromagnetic (EM) properties of earth formation penetrated by a borehole has been used for decades in hydrocarbon exploration and production operations. The resistivity of hydrocarbon is greater than saline water. A measure of formation resistivity can, therefore, be used to delineate hydrocarbon bearing formations from saline water bearing formations. Electromagnetic borehole measurements are also used to determine a wide range of geophysical parameters of interest including the location of bed boundaries, the dip of formations intersecting by the borehole, and anisotropy of material intersected by the borehole. Electromagnetic measurements are also used to "steer" the drilling of the borehole.

Borehole instruments, or borehole "tools", used to obtain EM measurements typically comprise one or more antennas or transmitting coils which are energized by an alternating electrical current. Resulting EM energy interacts with the surrounding formation and borehole environs by propagation or by induction of currents within the borehole environs. One or more receivers respond to this EM energy or current. A single coil or antenna can serve as both a transmitter and a receiver. Parameters of interest, such as those listed above, are determined from the response of the one or more receivers. Response of one or more receivers within the borehole apparatus may be telemetered to the surface of the earth via conveyance means that include a wireline or a drill string equipped with a borehole telemetry system. Alternately, the response of one or more receivers can be stored within the borehole tool for subsequent retrieval at the surface of the earth.

Standard induction and wave propagation EM tools are configured with transmitter and receiver coils with their magnetic moments aligned with the tool axis. More recently, induction tools with three axis coils and wave propagation MWD or LWD tools with antennas (coils) whose magnetic moments are not aligned with the tool axis are being produced and used. These MWD or LWD propagation tools, with antenna dipole axes tilted with respect to the tool axis, can distinguish resistivity differences as a function of tool azimuth. Tools with coils aligned with the tool axis cannot distinguish resistivity changes as a function of tool azimuthal angle. The azimuthal resistivity response feature of an electromagnetic MWD or LWD tool is most useful in direction or "geosteering" the drilling direction of a well in a formation of interest. More specifically, the distance and direction from the tool to a bed (such as shale) bounding the formation of interest, or water interfaces within the formation of interest, can be determined from the azimuthal resistivity response of the tool. Using this information, the drill bit can be directed or "steered", in real time, so as to avoid penetrating non hydrocarbon bearing formations with the borehole.

Prior art MWD or LWD tools that make azimuthal EM measurements employ a combination of separate axially aligned antennas and antennas whose magnetic moments are tilted at an angle with respect to the tool axis. Such tools, for example, are described in U.S. Pat. No. 6,476,609 issued to Bittar, and U.S. Pat. No. 6,297,639 issued to Clark et al. These tools have a fixed response azimuth, and can only preferentially determine resistivity or distance to a bed on one side of the tool, or at fixed azimuth angles relative to the tool. The tools must be rotated in order to respond to or "see" resistivity differences or boundaries on all sides of the borehole. Furthermore, the antennas with different dipole orientations located at different axial spacings along the length of the tool lack a common dipole origin point. This fact precludes vector addition of the dipole moments to form a new dipole moment, in any direction, with the same origin point. Multiple antennas at differing axial spacings also increase tool production and maintenance cost, and further reduces mechanical tool strength.

U.S. Pat. No. 6,181,138 issued to Hagiwara describes an antenna design that has three independent, co-located, antenna coils with a common tilt angle. Co-located in this context means having dipole moments whose origins are coincident and tilt angle is the angle between the tool axis and the dipole moment of the antenna coil. These antenna coils acting together can direct a transmitter or receiver resultant antenna dipole moment in any direction. This antenna design places coils around a drilling collar in a region of reduced diameter or "necked down" region. It is well known in the art that reducing the outer diameter of a drilling collar weakens it in that area and causes the collar to be more prone to mechanical failure. In this design also the coils must be covered with a non-conducting layer which must go all the way around the collar for the extent of the tilted coils. Non-conductive coverings presently used in the art such as fiberglass, rubber, epoxy, ceramics or plastic are subject to wear due to abrasion which occurs between the tool and the borehole wall, and are not as strong as the collar material. Because the non-conducting region must encircle the collar it is likely to contact the borehole wall unless the collar is further "necked down" causing further weakness. An extreme penalty is paid by "necking down" drilling tubulars. It is well known to those skilled in the art that reducing the outer diameter of a cylindrical member reduces the torsional and bending stiffness proportional to the forth power of the radius. For example, reducing the diameter of a 5 inch (12.7 centimeter) tubular to 4 inches (10.2 centimeters) reduces the torsional and bending stiffness by 59%.

U.S. Pat. No. 7,038,457 issued to Chen and Barber, and U.S. Pat. No. 3,808,520 issued to Runge, describe co-located triaxial antenna construction in which three orthogonal coils are wound around a common point on a borehole logging tool. They describe the virtues of having antennas with three orthogonal dipole moments all passing through the same point in the center of the logging tool. These patents are incorporated herein by reference. The teachings of both patents are more suitable for wireline tools because the disclosed coil windings would compromise the strength and durability of an MWD or LWD tool. Runge describes a triaxial antenna located in the center of a tool with non-conducting tool housing or "mandrel" around it. This is clearly not appropriate for MWD or LWD embodiment. It is known those of ordinary skill in the MWD or LWD art that a non-conducting tool body does not have the strength to support the severe mechanical requirements of tools used in drilling. Chen and Barber describe a technique for implementing an antenna structure with co-located magnetic dipole moments in which the transverse coils penetrate a mandrel through openings in the tool body. While this may be appropriate for wireline applications, openings in the tool body in which a coil is placed will cause weakness in the tool body. In addition provision must be made for drilling fluid or drilling "mud" to flow down within the body of an MWD or LWD tool. This mud usually flows in a conduit or channel in the center of the MWD or LWD tool, which is typically a drill collar. Embodied in a MWD or LWD system, the Chen and Barber design must somehow be modified to divert the mud away from the coils and the openings in the tool body thereby adding complexity and cost to the manufacture of the tool. Another problem encountered in embodying the Chen and Barber design as an MWD or LWD system is that, owing to the required non-conductive covering which is disposed around the circumference of the tool, the coils are not protected from abrasion which occurs between the tool and the borehole wall during drilling.

A crossed dipole antenna for wireline applications is described in U.S. Pat. No. 5,406,206 issued to Safinya et al. This patent describes a slot or cavity antenna with crossed magnetic dipoles and a dielectric backing. This system is purported to operate in the frequency range of 200 to 2000 MHz and as such would be only suitable as a pad mounted device which contacts the borehole wall during operation. The antenna described in the present patent can operate at frequencies below 10 MHz and does not require contact with the borehole wall for operation. The antenna of the present patent uses a thin plate of ferrite underneath current carrying wires and is much more efficient at lower frequencies A more robust antenna design suitable for MWD or LWD application is described in U.S. Pat. No. 5,530,358 issued to Wisler et al. This antenna is integrated into a drilling tubular affording maximum strength and abrasion resistance, but it is only a single axial dipole antenna. One of the key components of the Wisler et al system is the antenna wire pathways disposed beneath the surface of the drilling tubular surface to avoid any abrasion and so as not to reduce the strength of the tubular. Protection of the coils and their non-conducting covering in the Chen and Barber design may be partially accomplished by reducing the radius or "necking down" the drilling tubular in the antenna region similar to the Hagiwara design. However "necking down" in the region of the antennas will significantly reduce the tubular strength in that region, and the tool will therefore be more prone to failure downhole. Although more robust, the Wisler patent does not teach varying the direction of the antenna dipole moment.

SUMMARY OF THE INVENTION

The present invention is a MWD or LWD wave propagation resistivity logging system using an antenna comprising an array of cross-dipole elements with each element having cross magnetic dipoles. The array antenna concept provides a robust design that does not significantly reduce the structural integrity of a borehole drilling tubular or "mandrel" in which it is disposed. The array antenna and associated control and process methodologies are ideally suited for MWD or LWD systems. The disclosed apparatus and methods can, however, be applied to tools conveyed into the well borehole by other means such as wireline, tubing, slick line, and pump-down. Embodied as a MWD or LWD tool, the array design is robust is integrated into a drill collar body, and, in one preferred embodiment, requires only four "slots" in the form recesses in the drill collar per array antenna. The antenna elements are disposed in these recesses in the body of the drill collar, and are thereby protected by from abrasion and other damage caused by the rotation or longitudinal movement of the drill string to which the tool is attached. Because the recesses do not extend around the periphery of the drill collar, they do not significantly reduce the strength of the drill collar. The antenna elements comprise a plate composed of a soft ferromagnetic material crossed or looped by separate and independent current carrying conductors, such as wires, in two or more directions forming preferably a bi-directional or crossed magnetic dipole. The soft ferromagnetic material is preferably ferrite. The wires and elements of the array may be individually operated or connected together to produce a triaxial common origin magnetic dipole antenna. In addition, the versatility provided by the antenna design allows the antenna to operate in other useful modes, such as a quadrupole mode, circularly polarized mode, or a longitudinal current mode.

A tool comprising a plurality of axially spaced cross dipole array antennas can be operated in a variety of modes, which are briefly summarized in the following paragraphs.

The tool can be operated as a standard, multi-spaced, fully compensated, propagation type resistivity tool by using only the z components of the antenna elements, wherein the z components are coincident with the major axis of the tool. Standard, multi-spaced, fully compensated propagation resistivity tools are known in the art and are described in many references including the previously referenced Wisler patent.

The tool can be operated as an azimuthal resistivity tool by using only the x and y components of the array antenna, where the x and y components are traverse or perpendicular to the major axis of the tool. The azimuthal measurement is made with respect to a specific point on the face of the tool. The previously referenced Runge patent and the Chen and Barber patent also describe methods of producing (or preferentially sensing) a transverse magnetic dipole.

The tool can be operated as an azimuthally steered resistivity tool by combining the x and y antenna components to point the magnetic dipoles of the transmitters and/or receivers in any azimuthal direction. For a rotating tool such as a rotating MWD tool, the azimuth can be chosen to be a function of borehole azimuth and thus be pointed in any direction (e.g. up or down) and independent of the tool azimuthal orientation.

The tool can be operated as a variable depth of investigation azimuthal tool by varying the direction of the dipole moment in the x, y and z direction and with respect to inclination relative to the tool.

The tool can be operated to produce or sense a magnetic quadrupole field by directing magnetic dipoles moments in opposite directions on at least two antenna elements.

The tool can be operated to produce a circularly or elliptically polarized field by energizing the crossed wires on an antenna element with signals typically 90 degrees out of phase with one another. The circularly polarized signal can be detected by receiving signals on antenna element wire and combining the signals with one shifted by typically 90 degrees of phase.

The tool can be operated to produce or sense a longitudinal current on a drill collar exterior by directing the magnetic dipoles generated or detected by antenna elements in the same azimuthal direction around the periphery of the collar.

BRIEF DESCRIPTION OF THE DRAWINGS

So that the manner in which the above recited features, advantages and objects the present invention are obtained and can be understood in detail, more particular description of the invention, briefly summarized above, may be had by reference to the embodiments thereof which are illustrated in the appended drawings.

DETAILED DESCRIPTION OF THE PREFERRED EMBODIMENTS

The present invention is described herein as a MWD or LWD wave propagation resistivity logging system comprising an integrated dipole array antenna. For brevity, both MWD and LWD systems will be referred to as "MWD" systems. The array antenna comprises several array elements that can act alone or in combination to produce a variety of measurement modes. Each array element is a cross-dipole element having cross magnetic dipoles. The dipole antenna components are used as both transmitters and receivers. Subsequent descriptions of antenna operation in a transmission mode apply equally to antenna operation in a reception mode. It will be realized by those familiar with the art that all of the magnetic dipole based antennas discussed in this disclosure can operate in either a transmission mode or a reception mode.

In a transmission mode, magnetic dipoles are generated by controlling, preferably with a numerically controlled oscillator (NCO) cooperating with a processor, the phase and amplitude of the current that energizes a particular wire in an antenna element. The direction of transmission is controlled by the geometry of the wire and element. The net direction of the magnetic dipole generated by a combination of simultaneous energizing currents is a resultant dipole comprising the vector sum of the individual magnetic dipoles.

In a reception mode, signals received on a particular wire in an antenna element due to magnetic coupling with a transmitted field will be proportional to the vector projection of the transmitted field magnetic vector onto the preferential direction of the particular antenna element and wire combination. This preferential direction is determined by the geometry of the antenna element. The signals from a group of these wires, each responding preferably to a magnetic field in a particular direction, may be combined by weighting each signal and summing to produce a signal that has a response to another preferential direction. The combination is preferably controlled by a processor.

Stated another way, controlling the signal input to the wires in a transmission mode or weighting the output signal from the wires in a reception mode are equivalent in the sense that the preferential direction of an antenna dipole moment may be controlled.

Overview of the Array Antenna Embodiments

Figure 1:
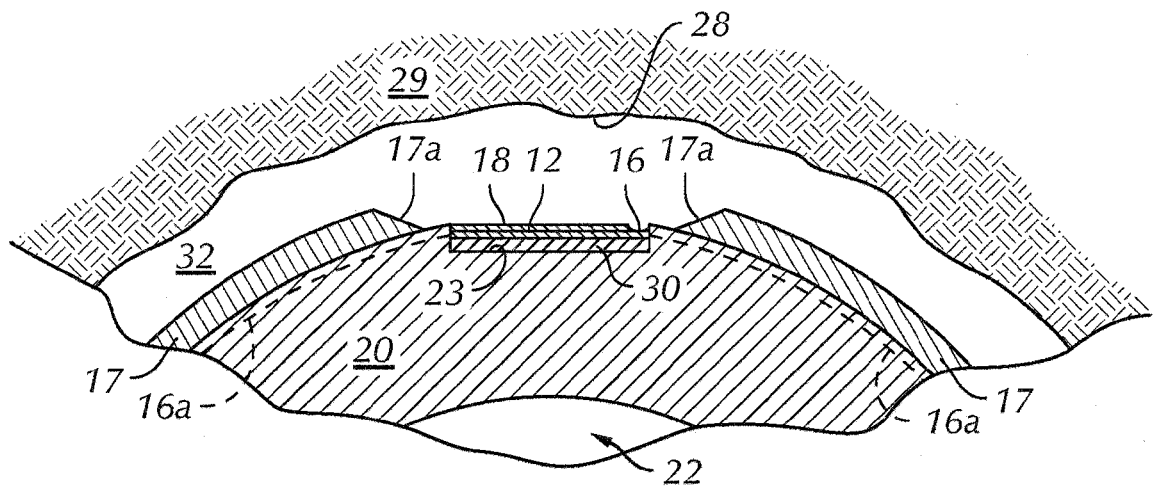
FIG. 1 shows an azimuthal cross section view of an antenna element disposes in a recess on the outer surface of a tool housing.

FIG. 1 shows an azimuthal cross section view of a cross-dipole antenna element disposed in a recess 23 on the outer surface of a mandrel serving as a housing for a tool 20. The mandrel is preferably a drill collar comprising a conduit 22 through which drilling fluid flows. The tool 20 is shown disposed within a borehole 32 defined by a borehole wall 28 and penetrating an earth formation 29. The mounted antenna element comprises a plate composed of high magnetic permeability material 30 disposed in the recess 23. Owing to its low loss and high magnetic permeability characteristics, the preferred material composing the plate is ferrite, and in what follows this material will be referred to as ferrite. In this embodiment, a portion of wires 16 and 12 cross the surface of the ferrite plate 30 at right angles, but do not contact each other or the ferrite electrically. The wires are communicated from the recess to a circuit hatch (see FIGS. 7C, 8C and 9C) via wireways, illustrated with broken lines, below the outer surface of the tool 20. The wireway for wire 16 is illustrated at 16a. The wireway for wire 12 is indicated at 12a in FIG. 3.

Figure 3:
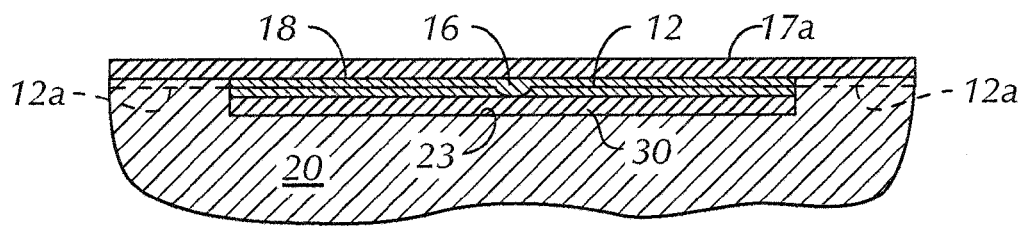
FIG. 3 is an axial cross sectional view of an antenna element that was shown in azimuthal cross sectional in FIG. 1.

Only one wire 12 is shown in FIG. 3, but a plurality of wires may be disposed within the wireway in the same manner.

Again referring to FIG. 1, the ferrite plate 30 is covered by a non-conducting covering layer 18, such as a ceramic, in which the wires 12 and 16 are disposed. The term "non-conducting" material will be used to include partially conducting material or any covering material 18 which does not significantly attenuate an electromagnetic signal. Because most ferrite withstands compression very well but shears easily, the non-conducting layer 18 can allow the ferrite plate 30 to experience downhole pressure as long as the pressure is applied evenly to all surfaces of the non-conducting material 18 and the abutted ferrite plate 30. Industry standard methods of protecting the ferrite 30 from pressure with a non-conducting "hatch" may be used but are not shown. A hard-facing wear element 17 fabricated from a material such as tungsten carbide is shown at a larger diameter than the non-conducting material 18 to protect the antenna element from damage downhole. The hard-facing wear element 17 is preferably fabricated with a beveled lip 17a to reduce torque shear encountered when the tool 20 is rotated in the borehole 32. One skilled in the art will recognize that a current in the wire 12 will produce a magnetic dipole field perpendicular to the tool axis and tangent to the tool surface with its origin at the center of the element. This axis of the antenna element will be termed "lateral". A current in the wire 16 will produce a magnetic dipole field parallel to the tool axis and also tangent to the tool surface with its origin also at the center of the element. This axis will be termed "longitudinal".

Figure 2:
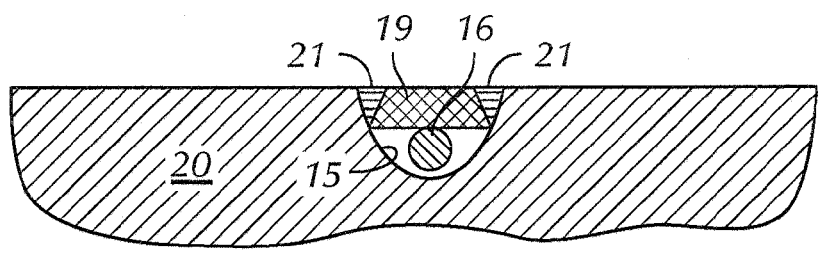
FIG. 2 is a cross-section of a typical wireway housing the wire.

FIG. 2 is a cross-section of a typical wireway housing the wire 16. Only one wire is shown but several wires may be contained in the wireway housing. The wireway comprises a groove 15 machined into the outer surface of the tool 20. The groove 15 is covered with a metal cap 19 that is secured to the tool by welds 21. Using the structure illustrated in FIG. 2, the wires feeding the antenna elements are protected from abrasion that occurs when the drilling tools contact the borehole wall.

FIG. 3 is an axial cross sectional view of an antenna element that was shown in azimuthal cross sectional in FIG. 1. The wireway 12a housing the wire 12 within the wall of the tool 20 is clearly illustrated. FIG. 3 also illustrates wires 12 and 16 disposed at right angles across the surface of the ferrite plate 30 which, in turn, is disposed in the recess 23 along with the covering layer 18.

Figure 4:
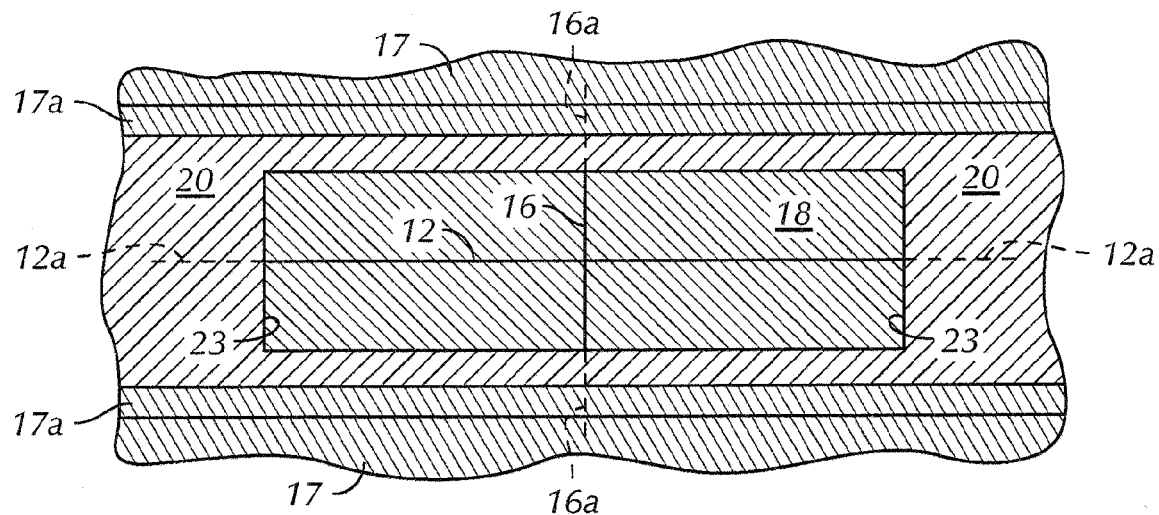
FIG. 4 is a top view of an antenna element that is shown in cross sectional in FIGS. 1 and 3.

FIG. 4 is a top view of an antenna element that is shown in cross sectional in FIGS. 1 and 3. This view clearly shows wires 12 and 16 crossing at right angles, with wire 12 being parallel to the major axis of the tool 20. It is noted that both wires 12 and 16 are disposed within the non-conducting material 18, as clearly shown in FIGS. 1 and 3.

Figure 5A:
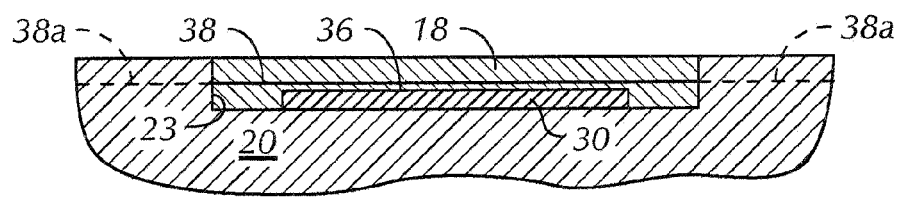
FIG. 5A shows cross sectional views depicting a first wiring scheme for an antenna element.
Figure 5B:
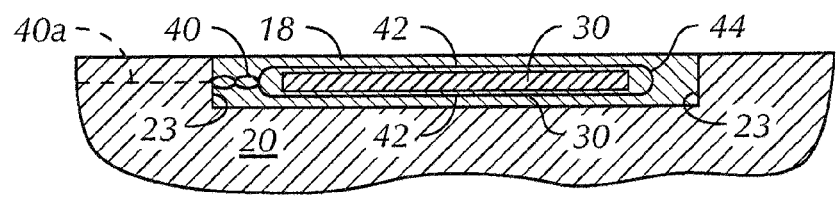
FIG. 5B shows cross sectional views depicting a second wiring scheme for an antenna element.

FIGS. 5A and 5B show cross sectional views depicting two wiring schemes for an antenna element.

FIG. 5A shows wire or wires 38 exiting a wireway 38a on the left into the recess 23 in the tool 20, going across the surface of the ferrite plate 30, and exiting into the wireway 38a on the right. Current flowing the wire or wires 38 going left to right will produce a magnetic field that is perpendicular to the plane of the cross sectional illustration. Current flow in a wire 36 that is perpendicular to plane of the cross sectional illustration will produce a magnetic field in the left to right axis. By controlling the currents in wire or wires 38 and in the wire 36, one can producing two independent magnetic fields with axes parallel to the outer surface of the tool 20 at the position of the antenna element.

FIG. 5B shows a pair of wires 40, preferably twisted together to avoid losses, entering a collar recess 23 from a wireway 40a in the tool 20. The wires are wrapped around the ferrite plate 30 with one or more turns (only one shown) as illustrated at 44. As in the embodiment shown in FIG. 5A, the magnetic field produced by a current in the wires 40 entering from the left will produce a magnetic field perpendicular to the cross sectional illustration. A second loop 42, which is perpendicular to the first loop 44, is also wrapped around the ferrite plate 30. As with previous illustrations, more than one turn may be used. A current in the second loop 42 will produce a magnetic field in the left to right axis. The two currents in the loops 42 and 44 can be individually controlled and will produce magnetic fields with axes parallel to the outer surface of the tool 20 at the position of the antenna element. One will preferably be perpendicular or lateral to the tool axis and the other will be parallel to the tool axis or longitudinal. A combination of two wireways and wrapping around the ferrite plate may also be used, but is not shown. Also the wires forming the loops 42 and 44 can be replaced with flat conductors, especially the wires (not shown) that go between the ferrite plate 30 and the body of the tool 20 which is typically a steel drill collar. With flat conductors, the downhole pressure load on the ferrite 30 and the abutting non-conductor 18 can be evenly distributed to avoid cracking the ferrite.

Although the embodiments of cross-dipole antenna element shown in FIGS. 1 through 5B depict a particular crossed dipole design, other designs such as non-orthogonal wiring and more than two axes are obvious to one skilled in the art.

Figure 6A:
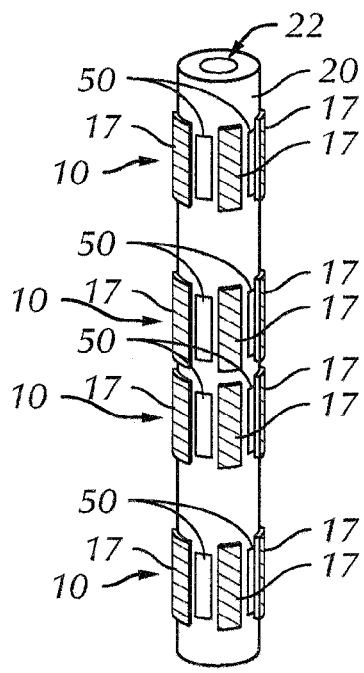
FIG. 6A shows a perspective view of a preferred embodiment comprising four antenna arrays spaced axially on a tool.

FIG. 6A shows a perspective view of a preferred embodiment comprising four array antennas 10 spaced axially on a tool 20, which is a drill collar. The drilling fluid flow conduit of the collar 20 is shown at 22. Each array 10 comprises four crossed dipole antenna elements 50 with previously discussed components disposed within tool recesses 23. These antenna element components 50 are electrically exposed to the borehole environs. The four elements 50 comprising each array 10 are preferably equally spaced in azimuth at 90 degree centers and are disposed at the same axial position on the drill collar 10. The embodiment of four cross-dipole elements comprising a single array antenna will be referred to as a "quad array". The wear elements of hard-facing material such as tungsten carbide are again identified with the numeral 17. In this embodiment, the location of the antennas is that of a single spaced borehole compensated propagation resistivity tool where the upper and lower antennas are transmitters and the middle two antennas are receivers.

Figure 6B:
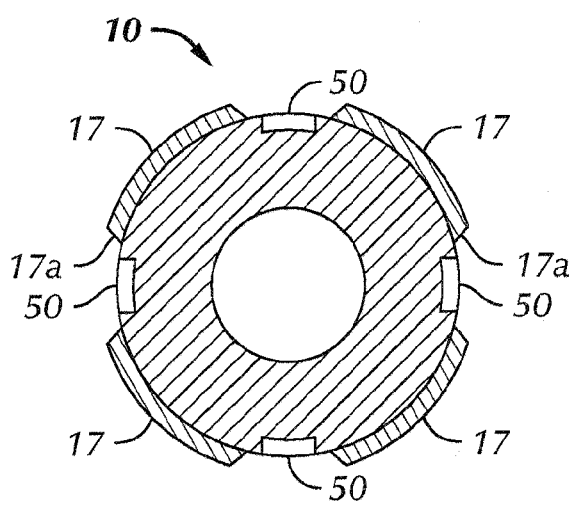
FIG. 6B is cross sectional view of one of the arrays is shown in FIG. 6A.

A cross sectional view of one of the quad array antennas 10 is shown in FIG. 6B, and more clearly illustrates the azimuthal deposition of the wear elements 17 with tapered lips 17a and the "electrically exposed" antenna elements identified at 50.

Figure 7A:
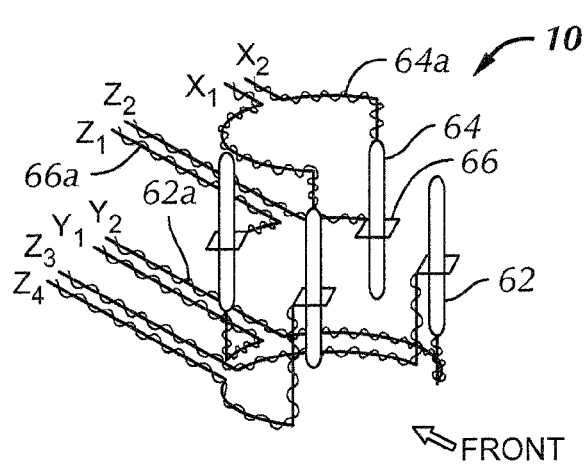
FIG. 7A shows a particular quad array antenna in which individual elements of the array are wired as in shown in FIG. 5B.

FIG. 7A shows a particular quad array antenna in which individual elements of the array are wired as in shown in FIG. 5B with twisted pair wiring going to each axis of each element. In this way, each of the two axes of each element is individually controllable. The pairs of wires are labeled $X_1$, $X_2$, $Y_1$, $Y_2$, $Z_1$, $Z_2$, $Z_3$, and $Z_4$. As examples, pairs $X_2$, $Y_2$, and $Z_2$ are identified at 64a, 62a and 66a, respectively, and form loops 64, 62 and 66, respectively. The "front" of the antenna is identified by the labeled arrow. In this embodiment $X_1$ and $X_2$ wire pairs control the lateral axes of two antenna elements positioned on opposite sides of a tool. Wire pairs $Y_1$ and $Y_2$ control the lateral axes of two antenna elements also positioned on opposite sides of the same tool but rotated 90 degrees of tool azimuth from $X_1$ and $X_2$. $Z_1$, $Z_2$, $Z_3$, and $Z_4$ wire pairs control the longitudinal axes of the four antenna elements in this antenna.

Figure 7B:
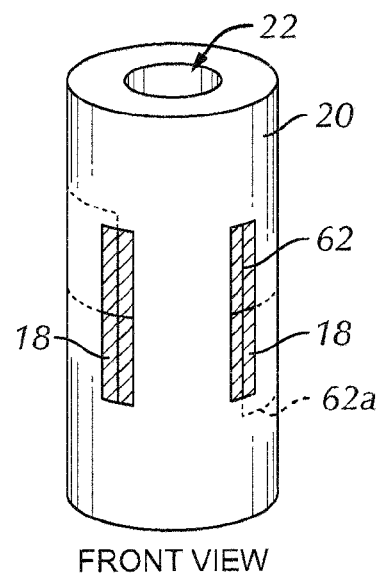
FIG. 7B shows a front view of the antenna of FIG. 7A disposed in a tool.
Figure 7C:
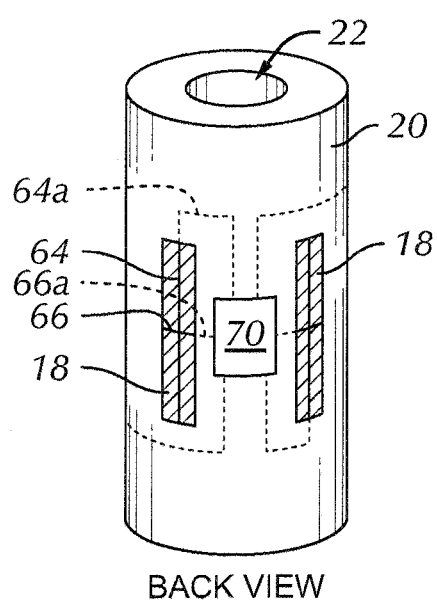
FIG. 7C shows a back view of the antenna of FIG. 7A disposed in a tool.

FIG. 7B illustrates the quad array antenna 10, embodied as shown in FIG. 7A, and disposed in the wall of a drill collar 20 comprising a conduit 22 through which drilling fluid flows. The orientation of the array antenna is the same as shown in FIG. 7A, therefore the illustration of FIG. 7B will be referred to as a "front view". Two axially coincident recesses are shown covered with the non-conducting material 18 and disposed at typically 90 degree azimuthal spacing on the outer surface of the collar 20. It should be understood that the ferrite plates 30 are disposed beneath the plates of non-conducting material 18 (see FIGS. 1, 3, 5A and 5B). Portions of the antenna wire components are disposed in wireways within the material 18. A portion of the loop 62 is shown as an example. Broken lines conceptually illustrate the disposition of the remaining portions of other antenna components in wireways the wall of the collar 20, with the wireway for the wire from the loop 62 being shown at 62a.

FIG. 7C again illustrates the quad array antenna 10 within the collar 20, wherein the collar has been rotated 180 degrees from the position shown in FIG. 7B. This illustration will be referred to as the "back view". As in FIG. 7B, portions of the dipole antenna components are disposed in wireways within the non-conducting material 18. Portions of the loops 64 and 66 are shown as examples. Broken lines again conceptually illustrate the disposition of the remaining portions of other antenna components in wireways the wall of the collar 20, with wire from the loop 66 being shown at 66a. Wires from the dipole components converge at a connection box covered by a hatch 70. The connection box contains electrical connections and tuning circuits for these dipole antenna components.

Figure 8A:
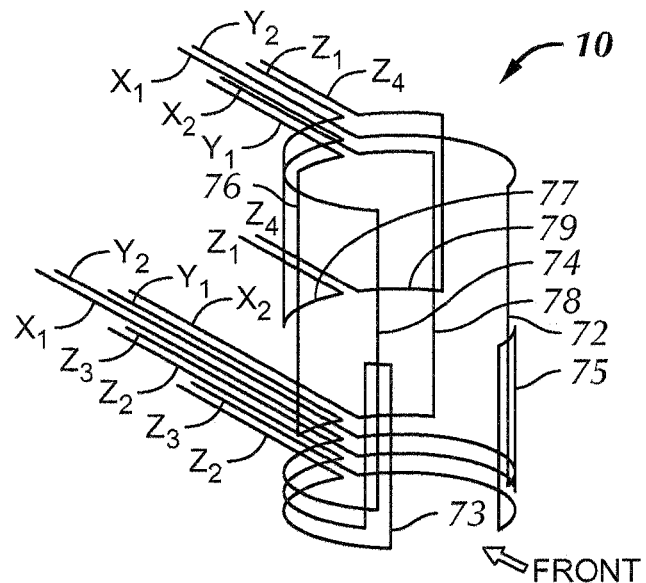
FIG. 8A shows a quad array antenna in which individual elements of the array are wired as shown in FIG. 5A.

FIG. 8A shows a quad array antenna 10 in which individual elements of the array are wired as shown in FIG. 5A and in FIGS. 1 and 3. More specifically, individual elements of the array are wired as in shown in FIG. 5A with single wiring going to each axis of each element. As in the embodiment shown in FIGS. 7A, 7B and 7C, each of the two axes of each element is individually controllable. The pairs of wires are labeled $X_1, X_2, Y_1, Y_2, Z_1, Z_2, Z_3$, and $Z_4$ as shown in FIG. 8A. As examples, $Y_2, Z_2, Z_4, Y_1, Z_1, Y_2$, are identified at 72, 73, 79, 76, 77, and 78, respectively. The "front" of the antenna is again identified by the labeled arrow.

Figure 8B:
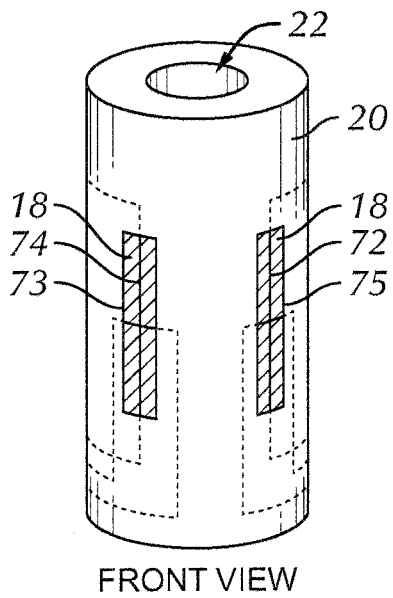
FIG. 8B shows a front view of the antenna of FIG. 8A disposed in a tool.

FIG. 8B illustrates the quad array antenna 10, embodied as shown in FIG. 8A, and disposed in the wall of a drill collar 20. The orientation of the array antenna is the same as shown in FIG. 8A, therefore the illustration of FIG. 8B will be referred to as a "front view". Two axially coincident recesses are again shown covered with the non-conducting material 18 and disposed at typically 90 degree azimuthal spacing on the outer surface of the collar 20. Like the previous embodiment, portions of the dipole antenna components are disposed in wireways within the material 18. More specifically, wires 73, 74, 72 and 75 are illustrated. The broken lines again conceptually illustrate the disposition of the remaining portions the antenna components in wireways the wall of the collar 20.

Figure 8C:
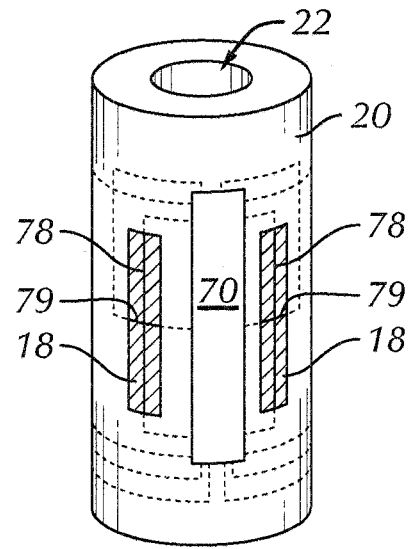
FIG. 8C shows a back view of the antenna of FIG. 8A disposed in a tool.

FIG. 8C illustrates the quad array antenna 10 shown in FIGS. 8A and 8B, wherein the collar 20 has been rotated 180 degrees from the position shown in FIG. 8B. This illustration once again will be referred to as the "back view". Portions of the antenna components are again disposed in wireways within the non-conducting material 18. Examples are shown at 76, 77, 78 and 79. Broken lines once again conceptually illustrate the disposition of the remaining portions of other antenna components in wireways. Wires from the antenna components again converge at the connection box covered by the hatch 70.

Figure 9A:
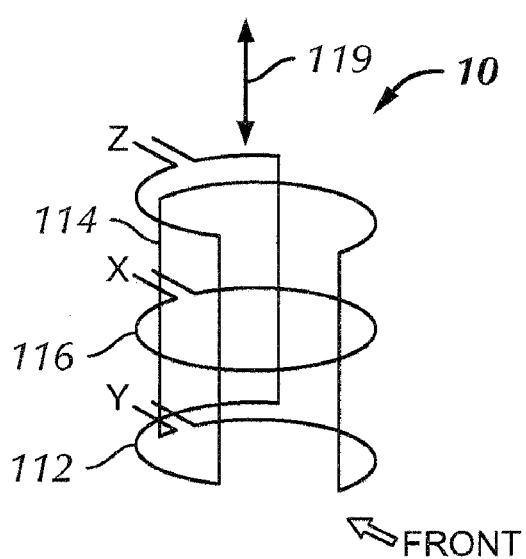
FIG. 9A shows an antenna embodiment comprising three separate wire pairs that produce three orthogonal magnetic dipole moments with a common origin.

FIG. 9A shows another method of wiring a quad array antenna 10. In this embodiment, there are three separate wire pairs that produce three preferably orthogonal magnetic dipole moments that are independently controllable and have a common origin. The wires 112, 114 and 116 used to control the elements are labeled X, Y, and Z, respectively. The front of the array is again denoted with an arrow. As is known in the art and described by previously referenced Runge and the Chen and Barber patents, there are measurement advantages afforded by a common origin triaxial antenna. Common origin triaxial applications disclosed in these patents can be achieved with the antenna embodiment shown in FIG. 9A. An advantage of the common origin triaxial antenna embodiment of this disclosure over the prior art is the robust design that affords both strength and abrasion protection for the antenna elements.

Figure 9B:
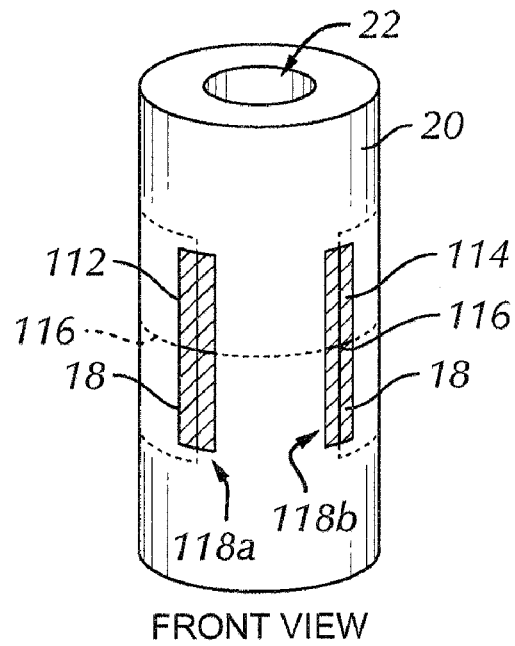
FIG. 9B shows a front view of the antenna of FIG. 9A disposed in a tool.

FIG. 9B illustrates the array antenna 10, embodied as shown in FIG. 9A, and disposed in the wall of a drill collar 20. Following the convention of previous illustrations, the orientation of the array antenna is the same as shown in FIG. 9A, therefore the illustration of FIG. 9B will be referred to as a "front view". Two axially coincident recesses are shown covered with the non-conducting material 18 and disposed at typically 90 degree azimuthal spacing on the outer surface of the collar 20. The wires 112, 114 and 116 are shown disposed in the non-conducting material 18 and in wireways within the tool 20, as illustrated conceptually with broken lines.

Figure 9C:
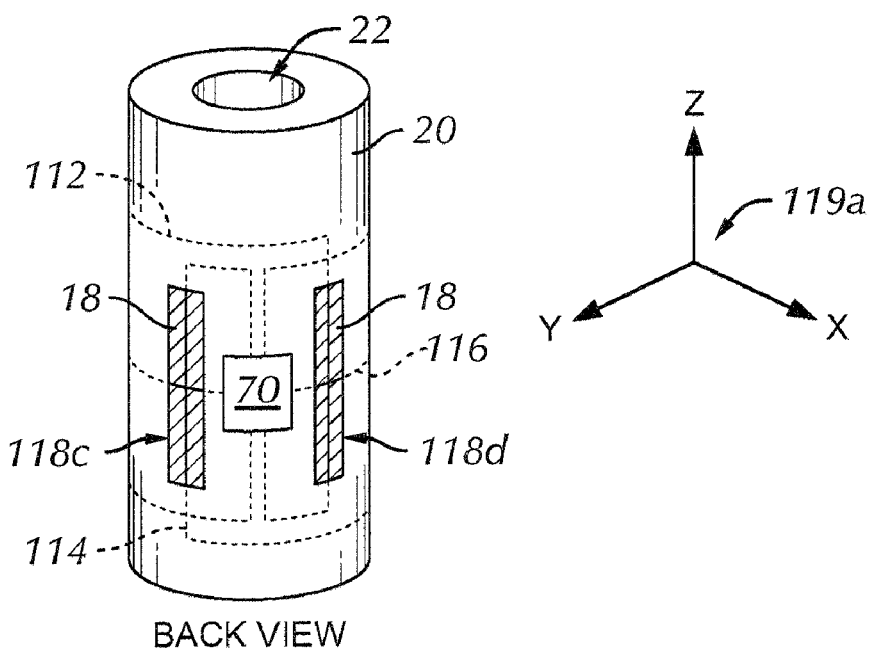
FIG. 9C shows a back view of the antenna of FIG. 9A disposed in a tool.

FIG. 9C illustrates the array antenna 10 shown in FIGS. 9A and 9B, wherein the collar 20 has been rotated 180 degrees from the position shown in FIG. 9B. Again following convention, this illustration is referred to as the "back view". Wires 112, 114 and 116 are again shown disposed in the non-conducting material 18 and in connecting tool body wireways that converge at the connection box covered by the hatch 70.

Attention is now directed to FIGS. 9A, 9B and 9C and the related Cartesian coordinate system 119a. Current in the X pair will energize the lateral axis of the two antenna elements labeled 118a and 118c with the same signal. This will produce a resultant magnetic dipole perpendicular to the tool axis (arrow 119 in FIG. 9A) and perpendicular to a plane containing the tool axis and the centers of the ferrite elements 30 (covered with non-conducting material 18) which the X labeled wire 112 crosses. The resultant dipole will be the sum of two dipoles produced on opposite sides of the collar 20 and thereby have an origin at the geometric center of the antenna array 10. A current in the Y pair will energize the lateral axes of the two antenna elements labeled 118b and 118d and thereby produce a resultant magnetic dipole identical to a current in the X pair, but rotated 90 degrees in azimuth about the Z axis which is coincident with the tool axis 119. Again, the resultant magnetic dipole will be the sum of the two dipoles on opposite sides of the collar 20 and thereby have an origin at the geometric center of the antenna array 10. A current in the Z pair will energize the longitudinal axes of the four antenna elements 118a, 118b, 118c and 118d and thereby produce a resultant magnetic dipole in a direction coinciding with the tool axis 119. This resultant magnetic moment will also have an origin at the geometric center of the antenna array 10.

Figure 10A:
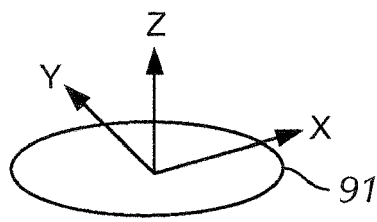
FIG. 10A defines a coordinate system to illustrate modes of antenna operation.

FIGS. 10B-10F show the direction of dipole moments for a quad array antenna 10, in several different modes of operation, with respect to the coordinate system defined in FIG. 10A. The mandrel 20, which is preferably a conducting drill collar, is not shown for clarity, but represented conceptually with a circle 91 defining the outer surface of the structure. It will be recognized that more than one mode may be produced and detected by a particular array antenna, such as the quad array antenna. These modes may be operated sequentially or may be operated simultaneously by frequency using methods known to those skilled in the art. Thus, a single tool can simulate multiple tools in a single measure period.

Figure 10B:
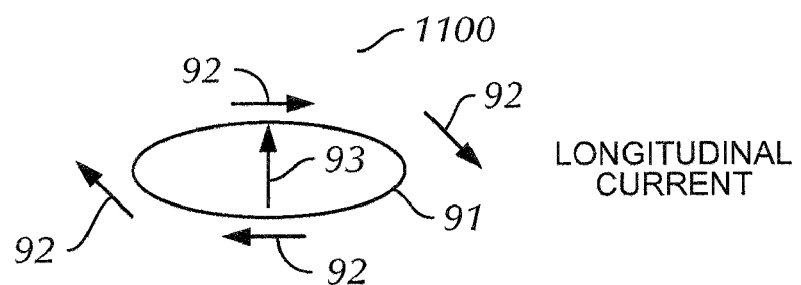
FIG. 10B shows the four antenna elements producing dipole moments 92 in a tip to tail fashion around the periphery of a conducting mandrel or drill collar.

FIG. 10B shows the four antenna elements producing dipole moments 92 in a tip to tail fashion around the periphery of a conducting mandrel or drill collar 91. It will be obvious to those skilled in the art that this antenna mode will launch (or detect) an axial current in a collar as illustrated conceptually with the arrow 93. The use of an antenna that launches or detects an axial current on the surface of an MWD tool is known in the art and will not be discussed in detail. Possible uses of this mode are data communication among MWD tools in the same drill string using the longitudinal current as the medium, and resistivity measurements including at the bit measurements in which the conduction of the axial current into the formation is measured.

Figure 10C:
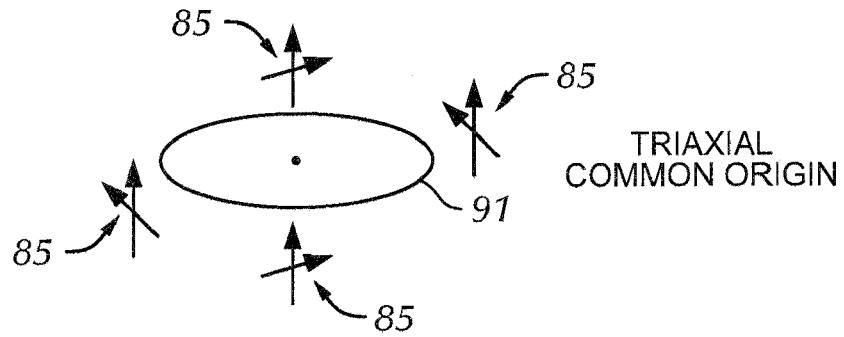
FIG. 10C shows the directions of the dipole moments for the triaxial common origin antenna.

FIG. 10C shows the directions of the dipole moments 85 for the triaxial common origin antenna. The axial or longitudinal dipoles are all pointed in the same direction (upward) and the lateral dipoles on opposite sides of the tool are pointed in the same direction. More specifically two lateral dipoles point in the X direction and the other two dipoles point in the Y direction. It will be obvious to one skilled in the art that when the Z direction dipole moments of the four antenna elements have the same magnitude and phase, the resultant dipole moment has an origin in the center of the tool and is also in the Z direction. Furthermore, when the two X direction dipole moments or the two Y direction dipole moments have the same magnitude and phase, their resultant dipole moments also have an origin in the center of the tool and point in their respective X or Y direction. It should also be obvious that the X, Y, and Z origin points are the same.

Although the antenna arrays described herein employ the preferred four element array, it should be obvious to one skilled in the art that array antennas with fewer than four or more than four elements can be constructed and combined to produce equivalent or similar results.

Figure 10D:
FIG. 10D shows a single element of the array with two axes in a lateral and in a longitudinal direction.

FIG. 10D shows a single element of the array with its two axes 87 in a lateral and in a longitudinal direction. As is well known to those skilled in the art, one can achieve circular or elliptical polarization by energizing these axes with sinusoidal currents that are 90 degrees out of phase with each other. Although not discussed in detail in this disclosure, this mode may be used to probe into the formation in a manner similar to a ground penetrating radar and to detect formation changes and anisotropy. It is well known that the use of circular polarization in ground penetrating radar applications is useful to increase the signal to noise ratio of the received signal.

Figure 10E:
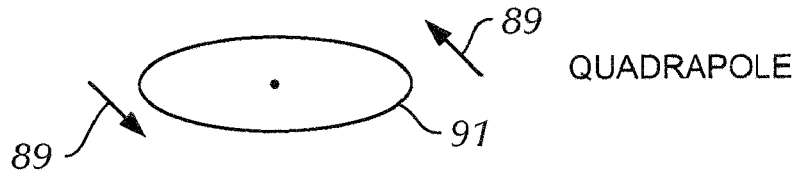
FIG. 10E shows dipole directions that will generate a field with a quadrupole moment.

FIG. 10E shows dipole directions that will generate a field with a quadrupole moment. The dipoles 89 shown are on opposite sides of the collar 91 and in opposite directions. The uses of this mode are also not discussed in detail but may include measurement of resistivity anisotropy.

Figure 10F:
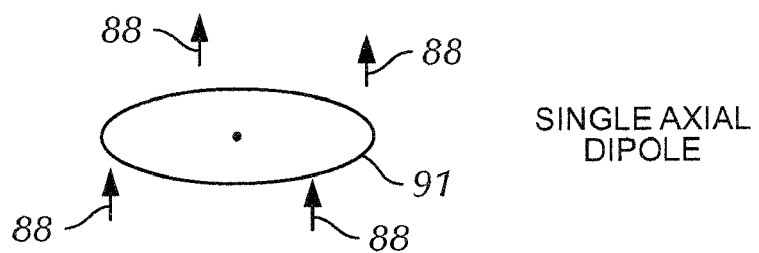
FIG. 10F shows the dipole moment orientations that will simulate a single axial dipole at the center of the quad antenna array.

FIG. 10F shows the dipole moment orientations 88 that will simulate a single axial dipole at the center of the quad antenna array, thus the quad antennas can be embodied to simulate traditional electromagnetic propagation resistivity tool antennas.

Elements of the System

Figure 11:
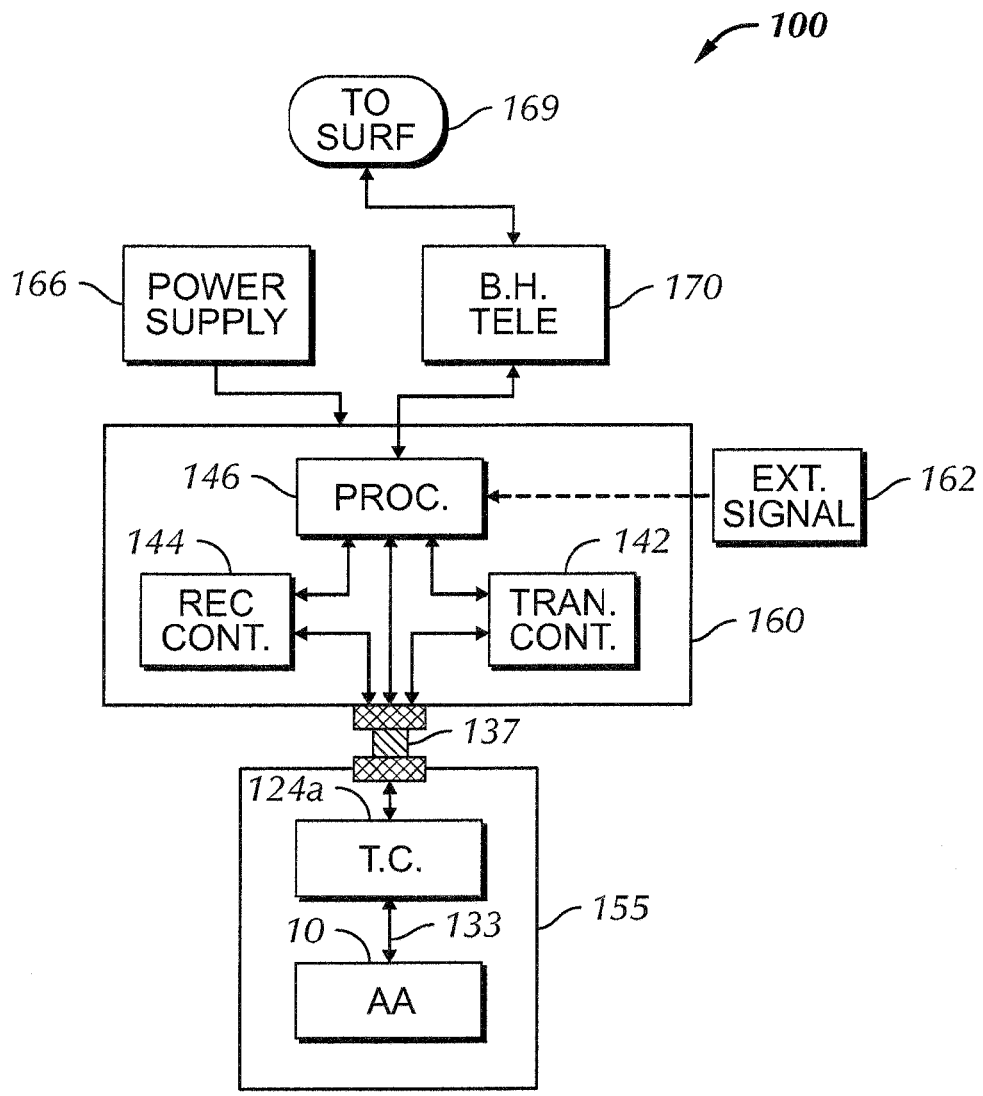
FIG. 11 is a functional diagram of various elements comprising the downhole assembly of the resistivity logging system.

FIG. 11 is a functional diagram of various elements comprising the downhole tool assembly 100 of the MWD resistivity logging system. The diagram is conceptual in nature, used for purposes of illustrating the operation of the system, and is not intended to limit the apparatus and methods of the system to specific mechanical configurations or electronic circuit designs. As discussed previously, components of the cross dipole array antenna 10 are disposed in the wall of a drill collar 20, wherein the drill collar wall serves as a pressure housing for the dowhhole portion of the wave propagation resistivity MWD logging system. The dipole antenna components of the array antenna 10, collar housing 20, connection box and hatch cover 70 (see FIGS. 7C, 8C and 9C), tuning circuits 124a, and related electrical connectors 133 are conceptually illustrated in FIG. 11 as a subsection 155.

Still referring to FIG. 11, the subsection 155 is electrically connected to an electronics subsection 160 by means of coaxial cables 137. The electronics subsection 160 comprises a receiver control circuit 144 and/or a transmitter control circuit 142. The antenna may be operated as a transmitter or as a receiver or may be sequenced between the two. Operation of the receiver control circuit 144 and the transmitter control circuit 142 is directed by appropriate signals from a processor 146. Control signals from an external source, such as an inclinometer or a magnetometer or even a clock, can be input through an input device into the processor 146. This external source and cooperating input device are illustrated conceptually at 162 with a broken line connecting the processor 146. Processor output is input into a borehole telemetry subsection 170. The borehole telemetry subsection can be one of a variety of MWD or LWD telemetry systems known in the art. Information from the electronics subsection 160 is stored in tool memory (not shown) typically disposed within the electronics section, or telemetered to the surface of the earth as shown at 169 via the borehole telemetry subsection 170, or stored in tool memory and telemetered to the surface. Data stored in the tool memory or telemetered to the surface may be compressed to accommodate limited memory and telemetry band width. Conversely, information can be telemetered from the surface to the downhole tool assembly 100 of the resistivity logging system. The subsection 155 and the electronics subsection 160 are powered by a power supply 166. The functionality of elements and components shown in FIG. 11 will be discussed in the following section of this disclosure.

Figure 12:
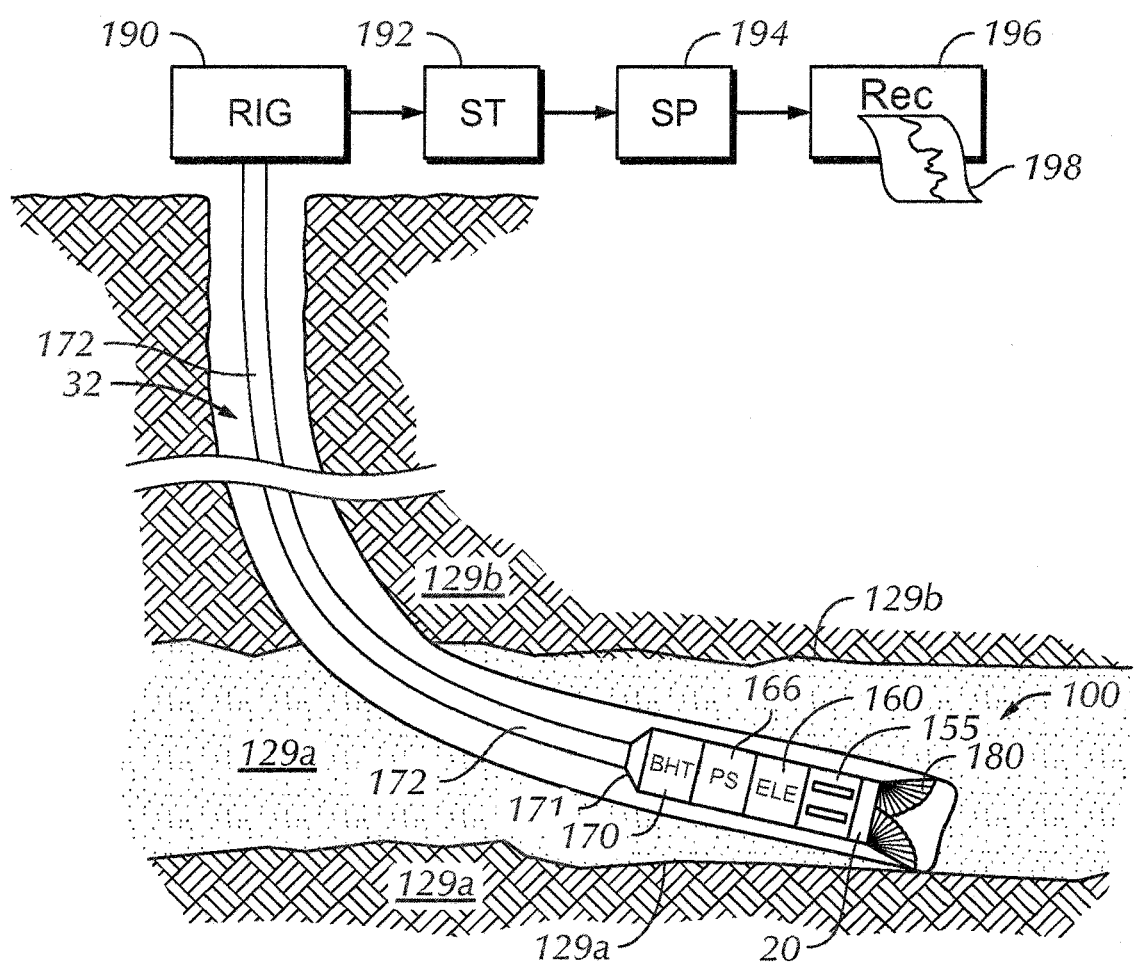
FIG. 12 illustrates all of the major components of the resistivity logging system in a MWD environment.

FIG. 12 illustrates all of the major components of the resistivity logging system in a MWD environment. The downhole tool assembly 100 of the system, shown disposed in a borehole 32, is operationally connected to a drill string 172 by means of a suitable connector 171. The lower end of the downhole assembly 100 is terminated by a drill bit 180. A rotary drilling rig, known in the art and represented conceptually at 190, rotates the drill string 172, downhole assembly 100, and drill bit 180 thereby advancing the borehole 32. As illustrated in the functional diagram of FIG. 11, the downhole assembly 100 comprises a subsection 155 containing at least one array antenna 10 and related tuning circuits 124a, an electronics subsection 160, a power supply subsection 166 and a borehole telemetry subsection 170. Each of these subsections is preferably disposed within the wall of a drill collar 20 that serves as a pressure housing for the downhole assembly 100. Data measured by the subsection 155 and processed by the electronics subsection 160 are telemetered via the borehole telemetry subsection 170 to the surface of the earth and received by a surface telemetry unit 192. A surface processor 194 cooperates with the surface telemetry unit 192 to handle and optionally perform additional mathematical operations upon the data received from the downhole assembly 100. Process data are output to a recorder 196 for storage and optionally for output as a function of measured depth thereby forming a "log" 198 of one or more parameters of interest. It should be understood that information, such as signals to vary the direction of drilling or signals to vary the operation of the at least one array antenna 10 in the subsection 155, can be transmitted from the surface to the downhole assembly via the surface telemetry unit 192 and the cooperating borehole telemetry subsection 170.

Again referring to FIG. 12, a deviated borehole 32 is illustrated. The borehole 32 penetrates an upper formation 129b and is then deviated so that the borehole is advanced within a formation 129a, which is bounded at the bottom by a formation 129c. Using hydrocarbon drilling operation as an example, formation 129a would be a hydrocarbon bearing formation such as an oil saturated sand. The upper formation 129b and the lower formation 129c would typically be non hydrocarbon producing formations, such as shales. The objective of the deviated drilling operation is to advance the borehole 32 within the producing formation, defined by bed boundaries 129b and 129a, thereby maximizing production from the producing formation. The use of the one or more array antennas 10 operating to produce azimuthally dependent resistivity measurements may be used to geosteer within the producing formation. Concepts and examples of azimuthally dependent resistivity tools used for geosteering are described in prior art, including the previously referenced U.S. Pat. No. 6,181,138 issued to Hagawara, U.S. Pat. No. 6,476,609 issued to Bittar, and U.S. Pat. No. 6,297,639 issued to Clark et al., which are hereby incorporated by reference.

Operation of the System

Operation of systems using embodiments of the present invention will be further illustrated by examples. Other embodiments of the teaching disclosed herein may be devised by those skilled in the art but remain within the scope of this disclosure.

It is well known in the art that tools with more than one depth of investigation are desirable. A particular embodiment of a tool employing quad array antennas to produce an azimuthally dependent measurement that has a variable depth of investigation is illustrated in FIGS. 13A-13D.

Figure 13A:
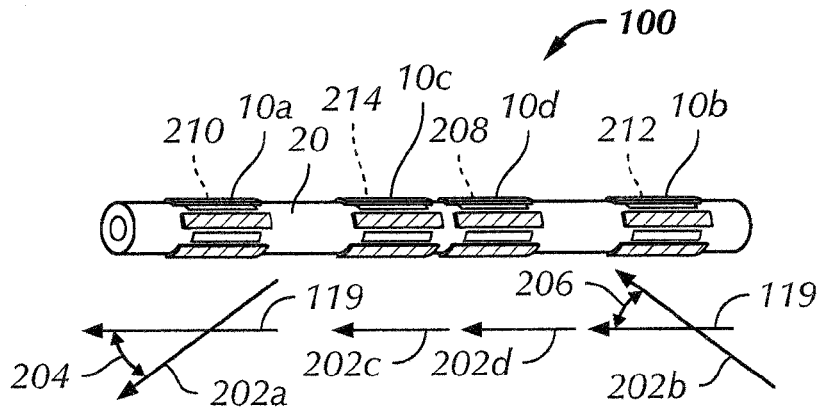
FIG. 13A shows a tool comprising a drill collar housing and four axially disposed quad antenna arrays.

FIG. 13A shows a downhole assembly tool 100 comprising a tool housing 20 shown as a drill collar and four axially disposed quad antenna arrays 10A, 10B, 10C and 10D. The arrows 202a, 202b, 202c and 202d conceptually represent the resultant dipole moments of four quad antennas 10A, 10B, 10C and 10D, respectively. As shown previously, each quad antenna array may produce a dipole moment in any direction. The outer quad antenna arrays 10A and 10B are operated as transmitters with the resulting dipole moments 202a and 202b, respectively, chosen to have a variable tilt angle 204 and 206, respectively, with respect to the tool axis 119. The inner antennas 10C and 10D are operated as receivers with their dipole moments 202c and 202d, respectively, parallel to the tool housing axis 119. The centers 210 and 212 of the transmitter antenna arrays 10A and 10B, respectively, are each axially spaced 46 inches (117 centimeters) from the axial center 208 of the tool housing 20. The centers 214 and 216 of the receiver antenna arrays 10C and 10D, respectively, are each axially spaced 4.0 inches (10.2 centimeters) from the center 208 of the tool housing 20. The tool is preferably operated as a standard 400 kilohertz (kHz) borehole compensated propagation resistivity tool, which is known in the art. The tilt angles of the transmitters can, however, be changed. More specifically, the tilt angles 204 and 206 of the transmitter arrays 10A and 10B can be changed thereby varying the region of sensitivity of the tool.

Figure 13B:
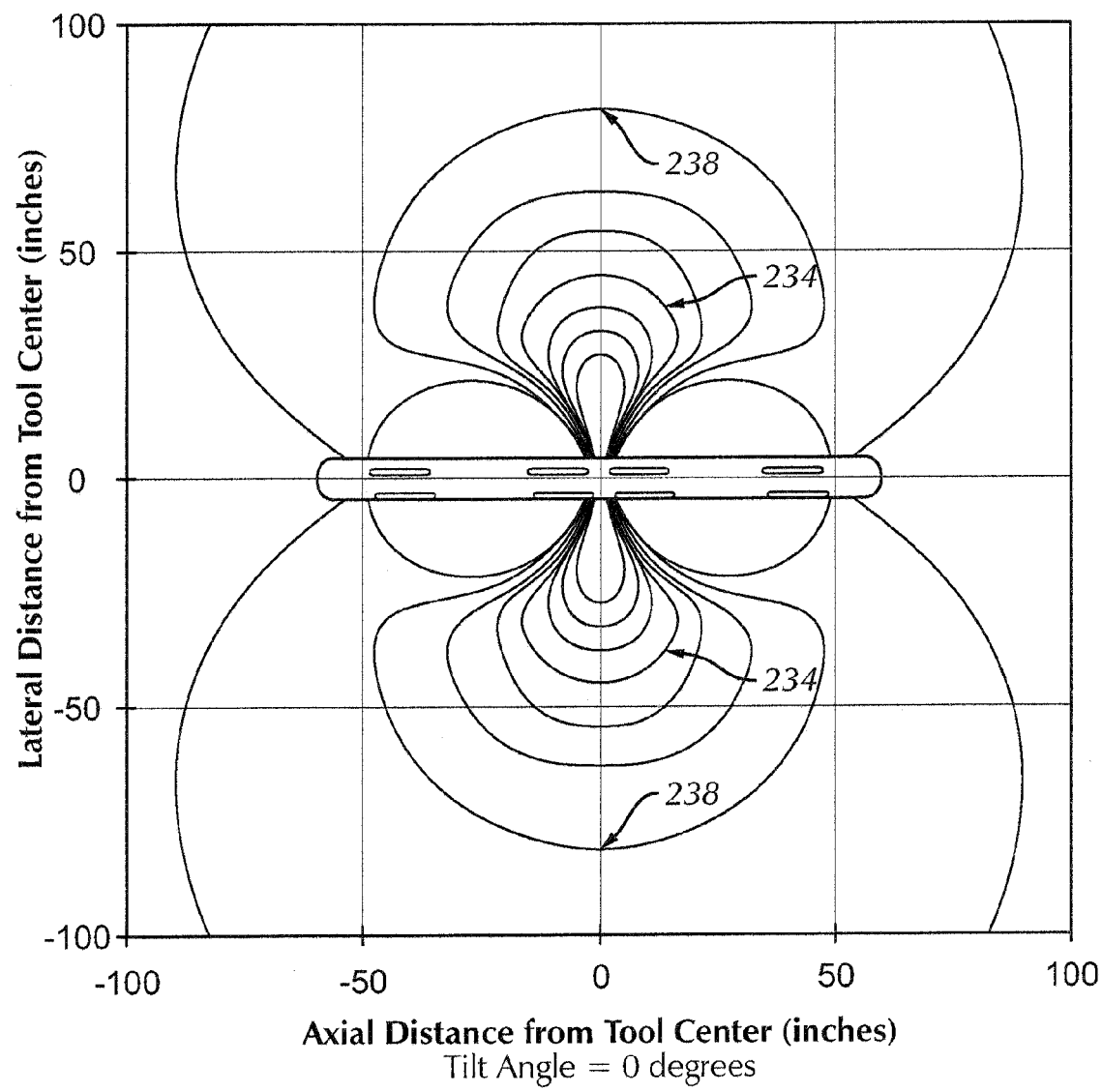
FIG. 13B is a contour plot illustrating the response of the tool when the tilt angles of the transmitter arrays are zero.

FIG. 13B is a computer generated contour plot illustrating the phase response of the tool 100 when the tilt angles 204 and 206 are zero. This is the configuration of the standard borehole compensated propagation resistivity tool. Identifying numbers for the four quad antennas 10A, 10B, 10C and 10D illustrated in FIG. 13A have been omitted for clarity in FIG. 13B as well as in subsequent FIGS. 13C and 13D. The abscissa and ordinate are in inches, with the center 208 of the tool at coordinate (0,0). The lighter shaded areas illustrate the regions where the tool is most sensitive to changes in resistivity. As an example, the tool is more sensitive in the area defined by contour 234 than in the area defined by contour 238. Sensitivity above and below the tool 100 is seen to be the same, as in known in the art for standard borehole compensated propagation resistivity tools.

Figure 13C:
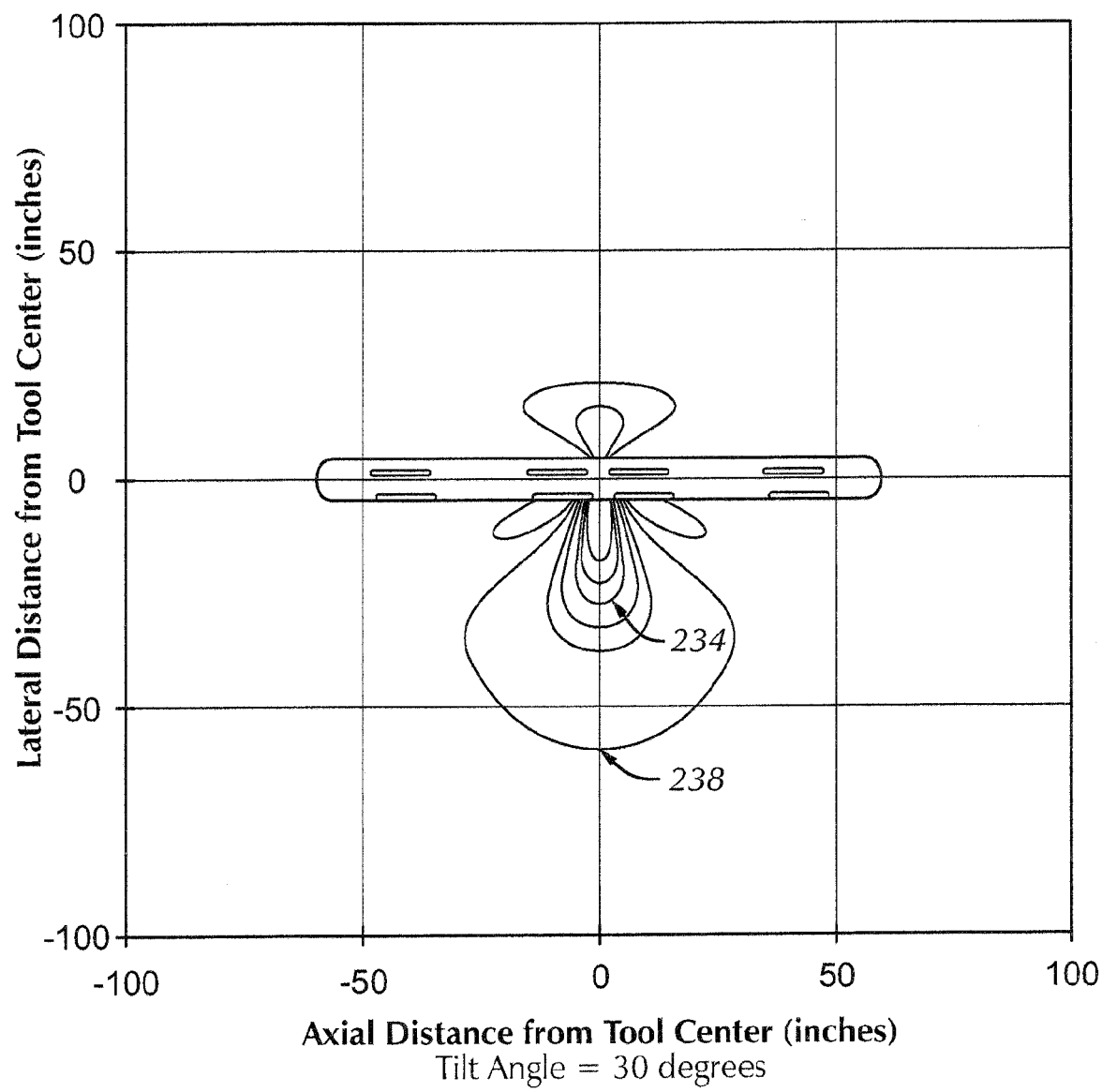
FIG. 13C is a contour plot illustrating the response of the tool when the tilt angles of the transmitter arrays are 30 degrees.

FIG. 13C is a computer generated contour plot illustrating the response of the tool 100 when the tilt angles 204 and 206 are 30 degrees. Again, the lighter shaded areas illustrate the regions where the tool is most sensitive to changes in resistivity. As in FIG. 13B, the tool is more sensitive in the area defined by contour 234 than in the area defined by contour 238. When the tilt angles are increased from zero to 30 degrees, it can be seen that the tool is more sensitive to regions below the tool than to regions above the tool.

Figure 13D:
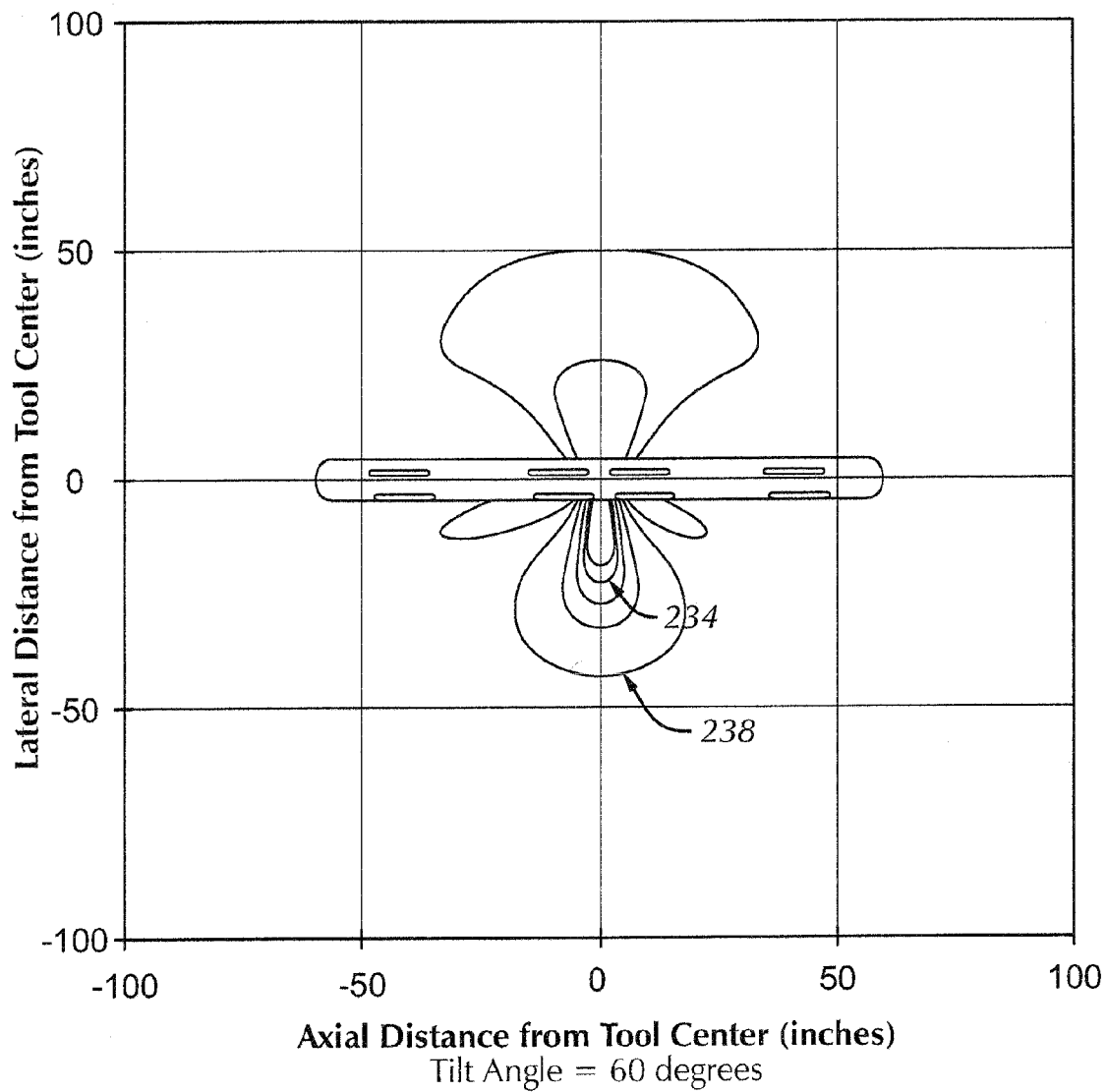
FIG. 13D is a contour plot illustrating the response of the tool when the tilt angles of the transmitter arrays are 60 degrees.

FIG. 13D is a computer generated contour plot illustrating the response of the tool 100 when the tilt angles 204 and 206 are 60 degrees. Once again, the lighter shaded areas illustrate the regions where the tool is most sensitive to changes in resistivity, with the tool being more sensitive in the area defined by contour 234 than in the area defined by contour 238. When the tilt angles are increased to 60 degrees, it can be seen from that the phase response of the tool is also more sensitive to regions below the tool, but sensitivity does not extend as far out radially as with the 30 degree tilt shown in FIG. 13C. Variations of the tilt angles 204 and 206 have thereby produced a variable depth of investigation.

Recall from previous illustrations and discussions that the resultant dipoles 202a and 202b as shown in FIG. 13A can be controlled electronically. Since these resultant dipoles define the tilt angles 204 and 206, the depth of investigation of the tool 100 can be varied without physically modifying elements within the quad antenna array.

Figure 14:
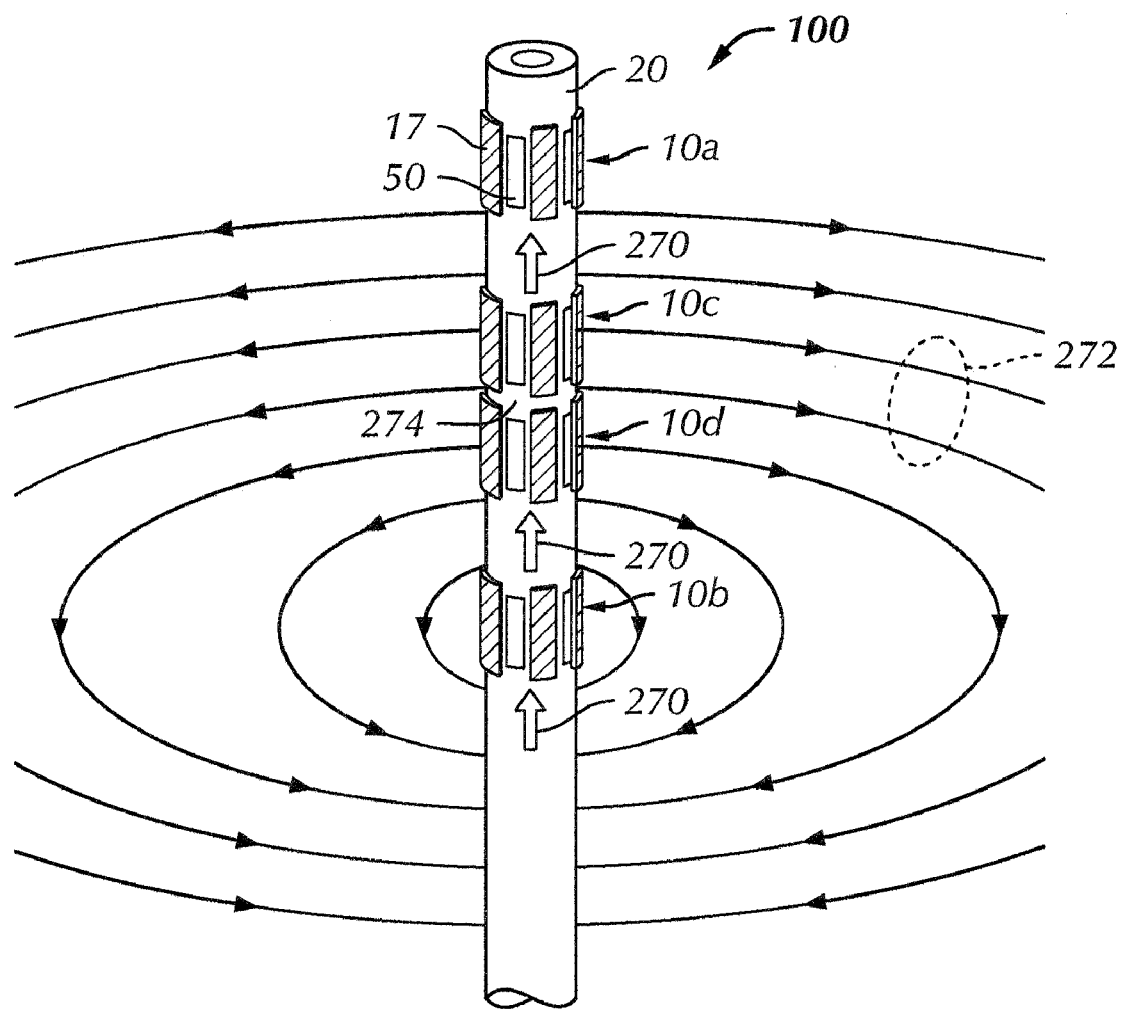
FIG. 14 illustrates a use of the axial current mode in which the antenna elements are operated in an azimuthal direction as shown in FIG. 10B.

FIG. 14 illustrates a use of the axial current mode in which the antenna elements are operated in an azimuthal direction as shown in FIG. 10B. In this mode the bottom antenna array 10B is operated as a transmitter and the two center antenna arrays 10D and 10C are operated as receivers. In this application the frequency of the transmitted signal is typically between 0.1 kHz and 20 kHz. It will be apparent to those skilled in the art that the transmitter array 10B, energizing antenna elements in a tip to tail fashion as shown in FIG. 10B, will induce an voltage longitudinally across the transmitter array. This voltage will, in turn, produce a longitudinal current in the collar as illustrated conceptually by the arrows 270. As the current 270 proceeds longitudinally, part of it will be returned through borehole mud and formation (not shown) to points below the transmitter 10B as shown in FIG. 14. In particular some of the current will exit the tool collar 100 between the two receivers 10D and 10C, as illustrated conceptually by the current lines 272. It will also be apparent to those skilled in the art that the two receivers 10D and 10C may be operated as current sensors by sensing the dipole elements in a fashion shown in FIG. 10B. A measure of the current exiting between the two receivers will be achieved by subtracting the current 270 in the tool collar 100 at receiver 10D from the current in the tool collar at receiver 10C. A voltage measurement may then be made at a point 274 between receivers 10D and 10C and a ground point internal to the collar (not shown). The wires to the voltage measurement points may be routed within wireways, such as those depicted by dotted lines in FIG. 7C, and connected to the surface of the tool collar 100 in a standard way, such as through a bulkhead connector (not shown). As is well known in the art, the resistivity of the formation may then be measured by dividing the voltage of the region between the receivers by the longitudinal current difference sensed between the two receivers, and multiplying by a constant known in the industry as a "tool" constant. The tool constant may then be determined by immersing the tool in water of a known conductivity.

The disclosure sets forth a versatile and robust antenna suitable for MWD. Each antenna is comprised of an array of crossed magnetic dipole elements. These elements may have at least two axes and may be individually controlled or may be wired together to produce a variety of operating modes, including but not limited to a common origin triaxial antenna.

While the foregoing disclosure is directed toward the preferred embodiments of the invention, the scope of the invention is defined by the claims, which follow.

The invention claimed is:

1. An array antenna formed on a body of a MWD/LWD tool disposed in a well, said array antenna comprising:
    a plurality of cross-dipole elements formed on the tool body, each of said plurality of cross-dipole elements comprising at least first and second wires crossing the surface of a high magnetic permeability material, wherein none of the wires is in electrical contact with each other or the high magnetic permeability material; wherein
    each of said plurality of cross-dipole elements is disposed within a slot recess in an outer surface of a wall of said tool body and; wherein
    the first wire traverses at least two elements to form an antenna with a magnetic dipole moment in a first direction, and the second wire traverses the same elements in a different direction to form a magnetic dipole in a second direction.

2. The array antenna of claim 1 wherein responses of said elements are combined to produce two or more resultant magnetic dipole moments with a common origin.

3. The array antenna of claim 1 wherein responses of said elements are combined to produce a resultant magnetic dipole moment with an origin at the geometric center of the antenna.

4. The array antenna of claim 1 further comprising a plurality of wear elements wherein:
    each wear element comprises a hard facing material; and
    one wear element is disposed on a periphery of said tool body between each pair of azimuthally adjacent elements.

5. The array antenna of claim 1 wherein responses from each said element are combined to produce a triaxial common origin magnetic dipole antenna.

6. The array antenna of claim 1 wherein said elements operate to produce and sense a circularly polarized magnetic dipole field.

7. The array antenna of claim 1 wherein said elements operate to produce and sense dipole moments in a tip to tail fashion around a periphery of said tool body thereby launching or sensing an axial current along said tool body.

8. The array antenna of claim 1 wherein said elements operate to produce and sense quadrupole moments.

9. The array antenna of claim 1 wherein said elements operate to produce and sense a single axial dipole at a radial center of said array antenna.

10. The array antenna of claim 1 wherein said elements operate to yield a plurality of depths of investigation.

11. The array antenna of claim 1 further comprising a processor cooperating with a numerically controlled oscillator to control currents flowing within said elements.

12. The array antenna of claim 1 further comprising a processor cooperating with a receiver circuit to detect and weight signals received from said elements.

13. The array antenna of claim 1 comprising four axially coincident elements spaced azimuthally at 90 degrees on a periphery of said tool body.

14. The array antenna of claim 1 wherein:
    each said element comprises a plurality of electrically insulated conductors; and
    portions of at least two said plurality of conductors cross one another at right angles within a recess of each said antenna element.

15. The array antenna of claim 1 wherein said array antenna transmits and senses magnetic dipole moments of at least two modes of operation.

16. The array antenna of claim 15 wherein said modes of operation are selected from a group consisting of: a circularly polarized magnetic dipole mode, an axial current mode, and a quadrupole moment mode.

17. The array antenna of claim 15 wherein said modes are transmitted or sensed sequentially.

18. The array antenna of claim 15 wherein said modes are transmitted or sensed simultaneously.

19. The array antenna of claim 15 wherein said modes are transmitted or sensed sequentially.

20. An array antenna formed on a tool body conveyed along a well borehole, said array antenna comprising:
    a plurality of cross-dipole elements formed on the tool body, each of said plurality of cross-dipole elements having cross magnetic dipoles; wherein
    each of said plurality of cross-dipole elements is disposed within a recess in an outer surface of a wall of said tool body wherein said recess does not penetrate through said wall of said tubular.

21. The array antenna of claim 20 wherein responses of said elements are combined to produce two or more resultant magnetic dipole moments with a common origin.

22. The array antenna of claim 20 wherein responses of said elements are combined to produce a resultant magnetic dipole moment with an origin at the geometric center of the antenna.

23. The array antenna of claim 20 further comprising a plurality of wear elements wherein:
    each wear element comprises a hard facing material; and
    one wear element is disposed on a periphery of said tool body between each pair of azimuthally adjacent elements.

24. The array antenna of claim 20 wherein responses from each said element are combined to produce a triaxial common origin magnetic dipole antenna.

25. The array antenna of claim 20 wherein said elements operate to produce and sense a circularly polarized magnetic dipole field.

26. The array antenna of claim 20 wherein said elements operate to produce and sense dipole moments in a tip to tail fashion around a periphery of said tool body thereby launching or sensing an axial current along said tool body.

27. The array antenna of claim 20 wherein said elements operate to produce and sense quadrupole moments.

28. The array antenna of claim 20 wherein said elements operate to produce and sense a single axial dipole at a radial center of said array antenna.

29. The array antenna of claim 20 wherein said elements operate to yield a plurality of depths of investigation.

30. The array antenna of claim 20 further comprising a processor cooperating with a numerically controlled oscillator to control currents flowing within said elements.

31. The array antenna of claim 20 further comprising a processor cooperating with a receiver circuit to detect and weight signals received from said elements.

32. The array antenna of claim 20 comprising four axially coincident elements spaced azimuthally at 90 degrees on a periphery of said tool body.

33. The array antenna of claim 20 wherein:
each said element comprises a plurality of electrically insulated conductors; and
portions of at least two said plurality of conductors cross one another at right angles within a recess of each said antenna element.

34. The array antenna of claim 20 wherein said array antenna transmits and senses magnetic dipole moments of at least two modes of operation.

35. The array antenna of claim 34 wherein said modes of operation are selected from a group consisting of: a circularly polarized magnetic dipole mode, an axial current mode, and a quadrupole moment mode.

36. The array antenna of claim 34 wherein said modes are transmitted or sensed simultaneously.

37. The method of claim 20 further comprising combining responses from each said element to produce a triaxial common origin magnetic dipole antenna.

38. A method for producing or sensing an antenna response of an array antenna, the method comprising:
forming said array antenna on a LWD/MWD tool body, said array antenna comprising a plurality of cross-dipole elements each disposed in a slot recess on an outer surface of the tool body, each of said plurality of cross-dipole elements comprising at least first and second wires crossing the surface of a high magnetic permeability material, wherein none of the wires is in electrical contact with each other or the high magnetic permeability material; and
combining responses of said elements to obtain said antenna response;
wherein the first wire traverses at least two elements to form an antenna with a magnetic dipole moment in a first direction, and the second wire traverses the same elements in a different direction to form a magnetic dipole in a second direction.

39. The method of claim 38 further comprising combining responses of said elements to produce two or more resultant magnetic dipole moments with a common origin.

40. The method of claim 38 further comprising providing said array antenna with a plurality of wear elements wherein:
each wear element comprises a hard facing material; and
one wear element is disposed on a periphery of said tool body between each pair of azimuthally adjacent elements.

41. The method of claim 38 further comprising operating said elements to produce and sense a circularly polarized magnetic dipole field.

42. The method of claim 38 further comprising operating said elements to produce and sense dipole moments in a tip to tail fashion around a periphery of said tool body thereby launching or sensing an axial current along said tool body.

43. The method of claim 38 further comprising operating said elements to produce and sense quadrupole moments.

44. The method of claim 38 further comprising operating said elements to produce and sense a single axial dipole at a radial center of said array antenna.

45. The method of claim 38 further comprising operating said elements to yield a plurality of depths of investigation.

46. The method of claim 38 further comprising controlling currents flowing within said elements with a processor cooperating with a numerically controlled oscillator.

47. The method of claim 38 further comprising a processor cooperating with a receiver circuit to detect and weight signals received from said elements.

48. The method of claim 38 wherein said array antenna comprises four axially coincident elements spaced azimuthally at 90 degrees on a periphery of said tool body.

49. The method of claim 38 wherein:
each said element comprises a plurality of electrically insulated conductors; and
portions of at least two said plurality of conductors cross one another at right angles within a recess of each said antenna element.

50. The method of claim 38 wherein said array antenna transmits and senses magnetic dipole moments of at least two modes of operation.

51. The method of claim 50 wherein said modes of operation are selected from a group consisting of: a circularly polarized magnetic dipole mode an axial current mode, and a quadrupole moment mode.

52. The method of claim 50 wherein said modes are transmitted or sensed sequentially.

53. The method of claim 50 wherein said modes are transmitted or sensed simultaneously.

54. A method for producing or sensing an antenna response of an array antenna, the method comprising:
forming said array antenna on a tool body conveyed along a well borehole, said array antenna comprising a plurality of cross-dipole elements formed on the tool body, each of said plurality of cross-dipole elements being disposed in a recess in an outer surface of said tool body wherein said recess does not penetrate through said wall of said tool body and each cross-dipole element comprising at least two wires crossing the surface of a high magnetic permeability material, wherein none of the wires is in electrical contact with each other or the high magnetic permeability material; and
combining responses of said elements to obtain said antenna response.

55. The method of claim 54 further comprising combining responses of said elements to produce two or more resultant magnetic dipole moments with a common origin.

56. The method of claim 54 further comprising providing said array antenna with a plurality of wear elements wherein:
each wear element comprises a hard facing material; and
one wear element is disposed on a periphery of said tool body between each pair of azimuthally adjacent elements.

57. The method of claim 54 further comprising combining responses from each said element to produce a triaxial common origin magnetic dipole antenna.

58. The method of claim 54 further comprising operating said elements to produce and sense a circularly polarized magnetic dipole field.

59. The method of claim 54 further comprising operating said elements to produce and sense dipole moments in a tip to tail fashion around a periphery of said tool body thereby launching or sensing an axial current along said tool body.

60. The method of claim 54 further comprising operating said elements to produce and sense quadrupole moments.

61. The method of claim 54 further comprising operating said elements to produce and sense a single axial dipole at a radial center of said array antenna.

62. The method of claim 54 further comprising operating said elements to yield a plurality of depths of investigation.

63. The method of claim 54 further comprising controlling currents flowing within said elements with a processor cooperating with a numerically controlled oscillator.

64. The method of claim 54 further comprising a processor cooperating with a receiver circuit to detect and weight signals received from said elements.

65. The method of claim 54 wherein said array antenna comprises four axially coincident elements spaced azimuthally at 90 degrees on a periphery of said tool body.

66. The method of claim 54 wherein:
  each said element comprises a plurality of electrically insulated conductors; and
  portions of at least two said plurality of conductors cross one another at right angles within a recess of each said antenna element.

67. The method of claim 54 wherein said array antenna transmits and senses magnetic dipole moments of at least two modes of operation.

68. The method of claim 67 wherein said modes of operation are selected from a group consisting of: a circularly polarized magnetic dipole mode, an axial current mode, and a quadrupole moment mode.

69. The method of claim 67 wherein said modes are transmitted or sensed sequentially.

70. The method of claim 67 wherein said modes are transmitted or sensed simultaneously.

* * * * *

UNITED STATES PATENT AND TRADEMARK OFFICE
CERTIFICATE OF CORRECTION

| | | |
|---|---|---|
| PATENT NO. | : 8,378,908 B2 | Page 1 of 1 |
| APPLICATION NO. | : 11/685040 | |
| DATED | : February 19, 2013 | |
| INVENTOR(S) | : Wisler et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1117 days.

Signed and Sealed this
Eighteenth Day of November, 2014

Michelle K. Lee
*Deputy Director of the United States Patent and Trademark Office*